UNITED STATES PATENT OFFICE.

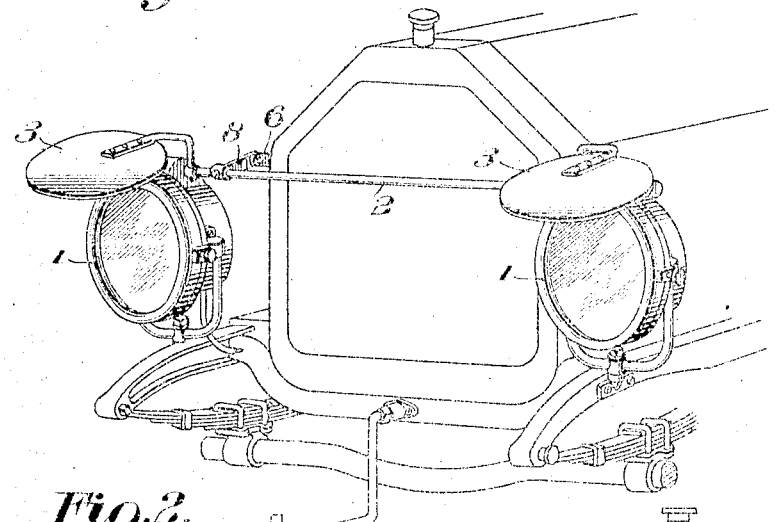
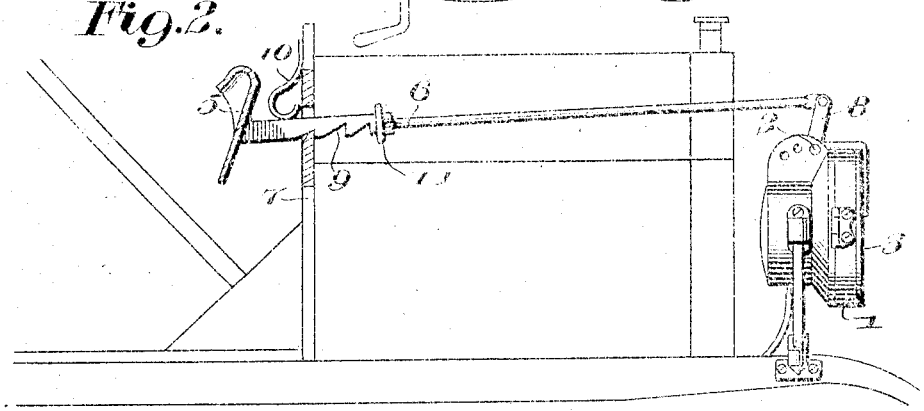
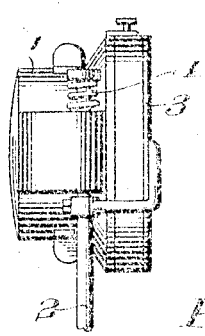

PATRICK J. E. O'BRIEN, OF MIDDLETOWN, NEW YORK.

VEHICLE-HEADLIGHT.

1,083,126.  Specification of Letters Patent.  Patented Dec. 30, 1913.

Application filed December 10, 1912. Serial No. 735,999.

*To all whom it may concern:*

Be it known that I, PATRICK J. E. O'BRIEN, a citizen of the United States, residing at Middletown, in the county of Orange and State of New York, have invented new and useful Improvements in Vehicle-Headlights, of which the following is a specification.

The primary object of this invention is to prevent the glare of the headlight of an automobile or other vehicle from interfering with the vision of the driver or operator of a passing machine or vehicle and at the same time to enable such headlight to illuminate the roadway so that the operator may avoid dangerous places or collision with any object.

The invention consists essentially of a lid or cover arranged in such relationship to the headlight as to control the light at night or to form a protector for the lens when the headlight is not in operation, said lid or cover being under control of the operator of the car to be moved to the required position.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a detail view in perspective, showing the application of the invention to the headlights of an automobile. Fig. 2 is a sectional detail. Fig. 3 is a further detail, showing more clearly the manner of connecting the lid or cover to the rock shaft and the manner of mounting the latter upon the lamp.

Corresponding and like parts are referred to in the following description, and indicated in all the views of the drawing, by the same reference characters.

The numeral 1 designates the headlights of an automobile, the same being of any make or type and arranged at the sides of the machine in the accustomed manner. A rock shaft 2 is mounted upon the head lamps in any manner and is provided with lids or covers 3 arranged to close over the front of the lamps so as to completely protect the lenses when the lamps are not in use. When the lamps are lighted the rock shaft occupies a position to hold the lids or covers 3 open, the same occupying a position above the lamps and projecting substantially horizontal therefrom. This position of the lids or covers is usually sufficient to prevent the glare of the headlights from materially interfering with the vision of the driver of a passing vehicle, but should it be deemed prudent to close the lids so as to direct the rays of light upon the road immediately in advance of the machine and prevent such rays from rising to such an elevation as to produce a glare which would blind or affect the vision of the driver of a passing machine the rock shaft may be turned to throw the lids at an angle to the horizontal, suitable connections being provided between the rock shaft and a pedal or other control within convenient reach of the driver. A spring 4 normally exerts a pressure to hold the lids or covers 3 open or in an approximately horizontal position. The covers 3 usually consist of metal disks of a size to extend over the front of the lamps so as to protect the lenses and to confine the rays of light.

In order that the lids or covers of the lamps may be under control an operating device is arranged within the car, the same consisting of a foot stall 5, which is attached to the inner end of a bar 6, which passes through the dash 7 and has its outer or front end pivotally connected to an arm 8 extending from the rock shaft 2. The bar 6 has a plurality of notches 9 which are adapted to engage a part of the dash so as to hold the lids or lamp covers 3 in the required position against the action of the spring 4. A spring 10 is secured to the dash or other part of the vehicle and exerts a pressure upon the bar 6 to hold a notched portion thereof in engagement with the dash.

When the lamps are lighted the lids or covers 3 project forwardly therefrom in an approximately horizontal plane, being held in such position by the spring 4. When the lamps are not required for use, as during the day, or at such times when the headlights are not required, the lids or covers 3 close against the fronts of the lamps, thereby protecting the lenses. When the lids are closed the bar 6 is pushed forward and a notch 9 is held in engagement with the dash by means of the spring 10. When the headlights are in operation and the driver observes the approach of a vehicle and it is required to confine the rays of light so as to preclude the possibility of the glare interfering with the vision of the driver of the approaching vehicle the operator of the car may press the bar 6 forward and thereby close the lids or covers to a greater extent, thereby directing the rays of light in a downward direction and shielding the lamps to such an extent as not to inconvenience the operator or driver of the approaching vehicle or machine. When the road is clear the bar 6 may be released by an upward and forward pressure upon the foot stall 5 so that the lids or covers may open to their full extent, thereby enabling the full scope of the headlight to be obtained.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

A set collar 11 is secured upon the bar 6 and limits the rearward movement thereof when the lids 3 are thrown open to the desired point. Upward pressure of the foot against the under side of the bar 6 will lift the notches 9 clear of the dash and admit of the spring 4 opening the lids. Forward pressure upon the foot stall 5 will close the lids to a greater or less extent as may be required.

Having thus described the invention what is claimed as new, is:—

In combination side lamps, a shaft arranged above the lamps and mounted thereon, arms connected with end portions of the shaft, covers for the lamps secured to the said arms, a spring mounted upon the shaft and having one end connected thereto and its opposite end connected with one of the lamps, said spring normally tending to turn the shaft to hold the lids open, a bar having a notched portion, an arm extending from the shaft and having the notched bar connected thereto, a guide for receiving the notched portion of the bar, a stop mounted upon the notched bar and adapted to engage the guide to limit the opening of the before mentioned lids, and a spring connected with the guide and adapted to exert a pressure upon the bar to hold its notched portion in engagement with the guide.

In testimony whereof I affix my signature in presence of two witnesses.

PATRICK J. E. O'BRIEN.

Witnesses:
LEE STEWART CRAUSE,
ARTHUR RUSSELL.